United States Patent
Craft et al.

(10) Patent No.: US 8,312,445 B2
(45) Date of Patent: Nov. 13, 2012

(54) USER-SPECIFIED INSTALL LOCATIONS

(75) Inventors: Julie Levell Craft, Austin, TX (US); Roji John, Austin, TX (US); Edward Shvartsman, Austin, TX (US); Marc Joel Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 11/865,493

(22) Filed: Oct. 1, 2007

(65) Prior Publication Data
US 2009/0089778 A1    Apr. 2, 2009

(51) Int. Cl.
G06F 9/445 (2006.01)
(52) U.S. Cl. ........ 717/174; 717/169; 717/175; 717/177; 717/178
(58) Field of Classification Search .................. 717/169, 717/175, 177, 178
See application file for complete search history.

(56) References Cited

U.S. PATENT DOCUMENTS

| | | | |
|---|---|---|---|
| 6,381,742 B2 * | 4/2002 | Forbes et al. | 717/176 |
| 7,222,341 B2 * | 5/2007 | Forbes et al. | 717/170 |
| 7,523,452 B1 * | 4/2009 | Kamity et al. | 717/178 |
| 7,747,997 B1 * | 6/2010 | Rao | 717/170 |
| 7,752,226 B1 * | 7/2010 | Harmer et al. | 707/796 |
| 2004/0093592 A1 * | 5/2004 | Rao | 717/168 |
| 2007/0022117 A1 | 1/2007 | Keohane et al. | |
| 2007/0192446 A1 * | 8/2007 | Ivory et al. | 709/220 |

OTHER PUBLICATIONS

"Change the Location of Windows Installation Files", PC Tools Software, pp. 1, May 12, 2002. http://www.pctools.com/guides/registry/detail/42/.

* cited by examiner

*Primary Examiner* — Phillip H Nguyen
(74) *Attorney, Agent, or Firm* — Yee & Associates, P.C.; David A. Mims, Jr.

(57) ABSTRACT

Computer implemented methods, data processing systems and computer program products install deliverables into user-specified install locations. A user-specified install location is provided. Software virtual product data is extracted from a software bundle. Software virtual product data is stored within the user-specified install location.

14 Claims, 4 Drawing Sheets

USER-SPECIFIED INSTALL LOCATIONS

BACKGROUND OF THE INVENTION

1. Field of the Invention

The present invention relates generally to a computer implemented method, apparatus, and computer code products for a data processing system. More specifically, the present invention relates to systems, methods and computer code products for a data processing system using user-specified install locations for installing software virtual product data.

2. Description of the Related Art

Typically before software is installed to a computer, the software is stored in a condensed form intended to ease the packaging and delivery of the software. This condensed form requires fewer resources for shipping or downloading that does the final installed version of the software. For example, software that is purchased online and is downloaded to a computer will require less time and bandwidth in its condensed form that in its expanded. In order to be used, the software must be expanded, or "unpacked," and the relevant information placed into corresponding directories and path locations on the computer. To expand these condensed software into a readable format, operating systems and other software applications, execute an installer or package management system (collectively referred to hereinafter as "installer" or "installers"). The installer automates the requisite processes for the installation of the software.

In addition to the software, packages often include other important information, such as the name of the software, a description of the software's purpose, the version number of the software, the name of the software vendor, checksum information, and a list of other dependencies that are required for the software to run properly. Collectively, this metadata is referred to as the software virtual product data (hereinafter referred to as "product data"). The product data is entered into a location connection object class database. The location connection object class database contains all of the other install locations that currently exist in the system and the product data associated with the software at that location, so that a global view of the data software installed in the data system can be obtained.

Product data, and most other deliverables, are installed via an absolute path. A path is the general form of a file or directory name, giving a file's name and its unique location in a file system. Paths point to their location using directories, and subdirectories until the destination is reached. This is conventionally shown using directory, subdirectory, and file names, separated by a delimiting character, most commonly the slash "/" or backslash character "\".

A path can be either absolute or relative. An absolute path is usually written in reference to a root directory. The absolute path points to the same location in the file system regardless of the working directory or combined paths. By comparison, a relative path is relative to the current working directory and not to the root directory. A relative path can be visualized as the difference between the absolute path and the current working directory.

Consider the following example:
Your current working directory is:
/users/eddie/
You want to change your current working directory to:
/users/eddie/newdirectory
The relative path from the directory /users/eddie to the directory /users/eddie/newdirectory is:
/newdirectory The absolute path from the directory /users/eddie to the directory /users/eddie/newdirectory is:
/users/eddie/newdirectory Product data, and most other deliverables, are installed via an absolute path. Installers utilizing only absolute paths are unable to install several instances of the same file set on a single system. Naming conventions for the file sets will cause subsequently installed file sets to overwrite those that were previously installed. Likewise, it is not possible for installers utilizing only absolute paths to install different versions of the same file set on a single system.

Installers utilizing only absolute paths are unable to install a file set that sends files to shared components in a shared operating system environment. Naming conventions for the file sets will cause subsequently installed file sets to overwrite those that were previously installed. File sets installed by one user would be overwritten by file sets installed by a second user.

It is difficult to integrate or detach an absolute path installed application from the system. Product data stored within the location connection object class database must be removed piecemeal and repackaged with the installed software for provisioning to another system. This situation makes it impossible, or at least very difficult, to provision preinstalled applications.

SUMMARY OF THE INVENTION

Computer implemented methods, data processing systems and computer program products install deliverables into user-specified install locations. A user-specified install location is provided. Software virtual product data is extracted from a software bundle. Software virtual product data is stored within the user-specified install location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
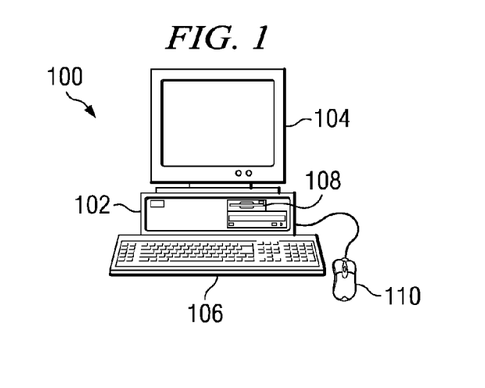
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 312. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
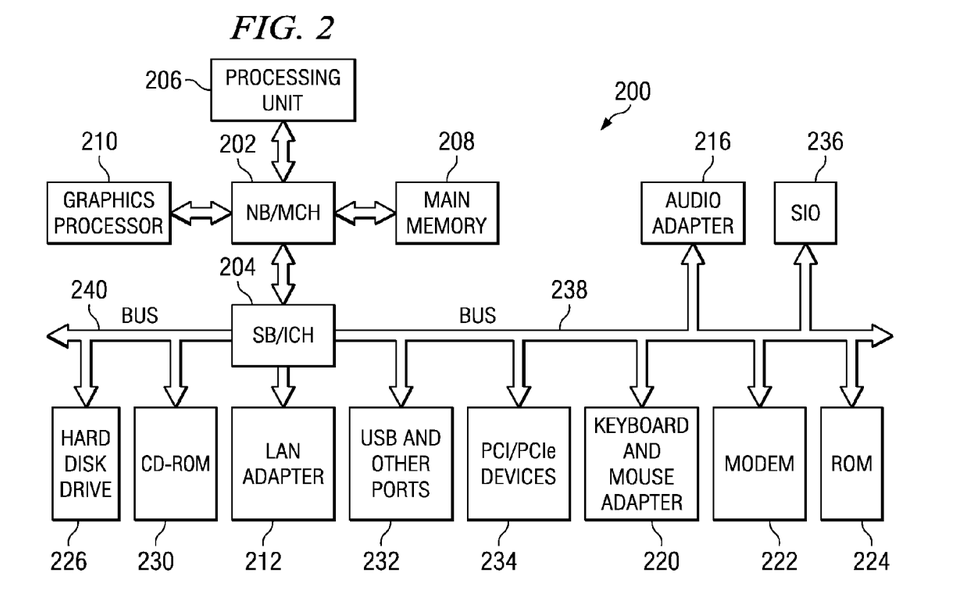
FIG. 2 is a step diagram of a data processing system in which illustrative embodiments may be implemented.

Next, FIG. 2 depicts a Step diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®, HP-UX®, Sun® Solaris®, or IBM® AIX® (Microsoft® and Windows XP® are trademarks of Microsoft Corporation in the United States, other countries, or both; IBM® and AIX® are trademarks of International Business Machines Corporation in the United States, other countries, or both; HP-UX® is a trademark of Hewlett Packard Corporation in the United States, other countries, or both; Sun® and Solaris® are trademarks of Sun Microsystems Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Installp is the native AIX proprietary package management system for handling the installation of software in the AIX operating system. AIX (Advanced Interactive executive) is a proprietary operating system developed by IBM based on the UNIX open source operating system (AIX and IBM are registered trademarks of International Business Machines Corporation; UNIX is trademark of UNIX System Laboratories).

Installp subdivides software installation into three parts based on general function of the files to be installed: "root", "usr", and "share". Each file set may have one or more parts. A file set may not have a root part without having a usr part.

The usr part is intended for files and configuration that are common across systems. The usr part of a software product contains that portion of the product that can be shared by machines that have the same hardware architecture. The majority of the deliverable is usually allocated to the usr part. The tracked usr parts of different systems installed at the same level of code should look identical.

By convention, and with few exceptions, usr deliverables, such as files and configuration changes, are installed directly to and maintained at the absolute path locations /usr and /opt. The product data corresponding to the usr part is typically maintained at the path location /usr/lib/objrepos. Usr product data class files can include files such as software version numbers, software version history, inventory, license program products, software names, and vendor names.

If a file set installed in the usr part also has a root part, the deliverables, and packaging files necessary to install the root part are typically maintained in /usr/lpp/<fileset package name>/inst_root. If a file set installed in the usr part also has a root part, the usr part is always installed before the root part.

The root part is intended for files and configurations that are local to the system. That is, the root part of a software product contains the part of the product that cannot be shared. In a client/server system, there must be a unique copy of the root files for each client of a server. Most of the root software is associated with the configuration of the data processing system or the software. The tracked root parts of different systems installed at the same level of code may be (and usually are) different.

By convention, root deliverables, such as files and configuration changes, are installed directly to and maintained at the absolute path location /file. Root product data is typically maintained at the path location /etc/objrepos. Root product data class files can include files such as software and version history, file inventory, license program products, and product names.

A file set may not have a root part without an associated usr part. The root part is always installed after the usr part.

The share part is much smaller than the usr and root part. The share part contains the part of the product that can be shared among different data processing systems, even if those systems have different hardware architectures. This would include nonexecutable text or data files. For example, the share part of a product might contain software like main pages and terminfo. The tracked share parts of different systems installed at the same level of code should look identical.

Share product data is typically installed directly to and maintained at the absolute path location /usr/share/lib/objrepos. Share product data class files include version history, file inventory, license program products, and product names.

This absolute path installation results in every package file having a predictable location. If a file set delivers a deliverable to a given path location, the install path will always be that path location. Applications therefore may implicitly rely on these static paths for all installp tracked binaries. However, because the install location always utilizes the same directories, the same file path cannot be owned by more that one file set.

A user-specified install location (hereinafter "USIL") is one or more virtual root directories that allow absolute path installations to be installed in a relative manner. Deliverables are installed at the USIL location plus the absolute path.

Each USIL maintains its own set of metadata. That is, each USIL maintains its own product data. Each USIL has its own usr part, its own root part, and its own shared part.

When a first USIL is created, for example USIL1, usr deliverables are installed directly to path locations /USIL1/usr and /USIL1/opt. The product data corresponding to the usr part is typically maintained at the path location /USIL1/usr/lib/objrepos. Root deliverables are installed directly to path location /USIL1/file. Root product data is typically maintained at the path location /USIL1/etc/objrepos. Share product data is installed directly to path location /USIL1/usr/share/lib/objrepos.

Thus, the USIL will allow installers utilizing absolute paths to install a file set that ships files to shared components in a shared operating system environment. So lont as separate USILs are utilized, subsequently installed file sets will not overwrite file sets that were previously installed. Thus, file sets installed by one user utilizing a first USIL will be overwritten by file sets installed by a second user utilizing a second USIL. Similarly, because all of the product data for a software is stored within the USIL, provisioning preinstalled applications to different locations becomes trivial.

Figure 3:
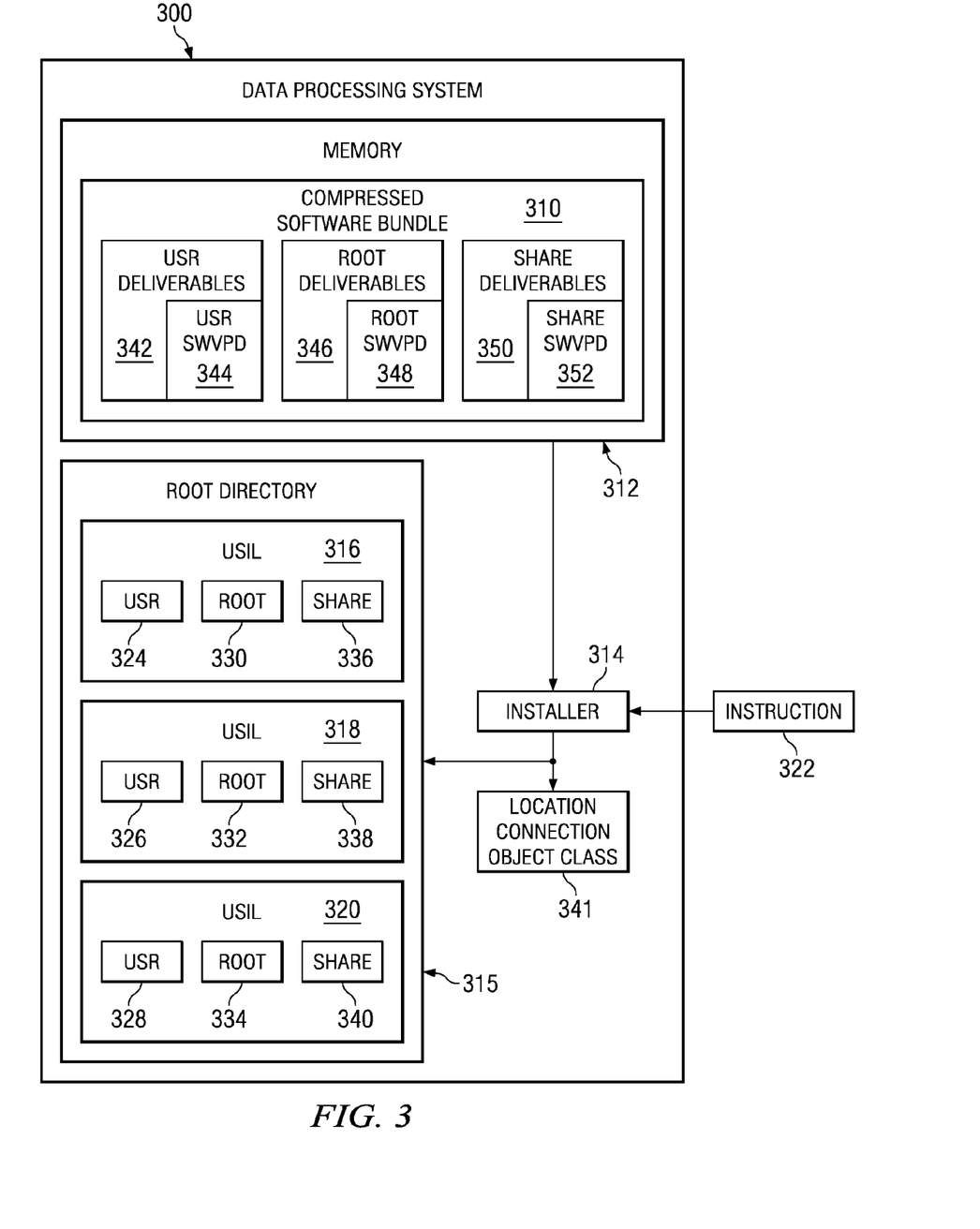
FIG. 3 is a block diagram of a software installation process to a user-specified install location executed on a data processing system, in accordance with an illustrative embodiment.

Referring now to FIG. 3, a block diagram of a software installation process to a user-specified install location executed on a data processing system is shown in accordance with an illustrative embodiment. Data processing system 300 is a data processing system, such as, without limitation, data processing system 100 in FIG. 1.

Compressed software bundle 310 is initially stored in memory 312 of data processing system 300. Compressed software bundle 310 requires fewer resources than the final installed software. Compression of the software bundle facilitates shipping or downloading of the software.

Installer 314 extracts various computer program code for software processes from the compressed software bundle 310 stored in memory 312. Installer 314 is a software process that automates the requisite processes for the installation of the software, expanding the compressed software bundle 310 into a readable format. Relevant information is "unpacked" from compressed software bundle 310 and the placed into corresponding directories and path locations on the computer.

Root directory 314 contains at least one USIL 316-320. Each USIL 316-320 is a virtual root directory that allows absolute path installations to be installed in a relative manner. Installer 314 receives instruction 322. Instruction 322 specifies to installer 314 one or more USILs 316-320 in which to install the pieces of compressed software bundle 310.

Each USIL 316-320 maintains its own set of metadata. That is, each USIL maintains its own product data. Each USIL 316-320 has its own usr part 324-328, its own root part 330-334, and its own shared part 336-340.

Location connection object class 341 is a data base containing the other install locations that currently exist in the system. Thus, the path for each installed program is contained in location connection object class 341. By examining location connection object class 341, you can determine a global view of the USIL install locations of deliverables on the system. When a deliverable is installed to a USIL, a corresponding entry on Location Connection Object Class 341 is updated with the USIL install location of the deliverable.

When compressed software bundle 310 is installed to USIL 316, usr deliverables 342 from compressed software bundle 310 are installed directly to usr part 324. If USIL 316 is given the path /USIL1, then usr deliverables 342 from compressed software bundle 310 are installed at /USIL1/usr and /USIL1/opt. Usr product data 344 corresponding to the usr part 324 is typically maintained at the path location /USIL1/usr/lib/objrepos.

Similarly, root deliverables 346 from compressed software bundle 310 are installed directly to root part 330. Root deliverables 342 from compressed software bundle 310 are installed at to path location /USIL1/file. Root product data 348 is maintained at the path location /USIL1/etc/objrepos. Share product data is installed directly to path location /USIL1/usr/share/lib/objrepos.

Similarly, share deliverables 350 from compressed software bundle 310 are installed directly to share part 336. Share product data 352 is installed directly to path location /USIL1/usr/share/lib/objrepos.

Figure 4:
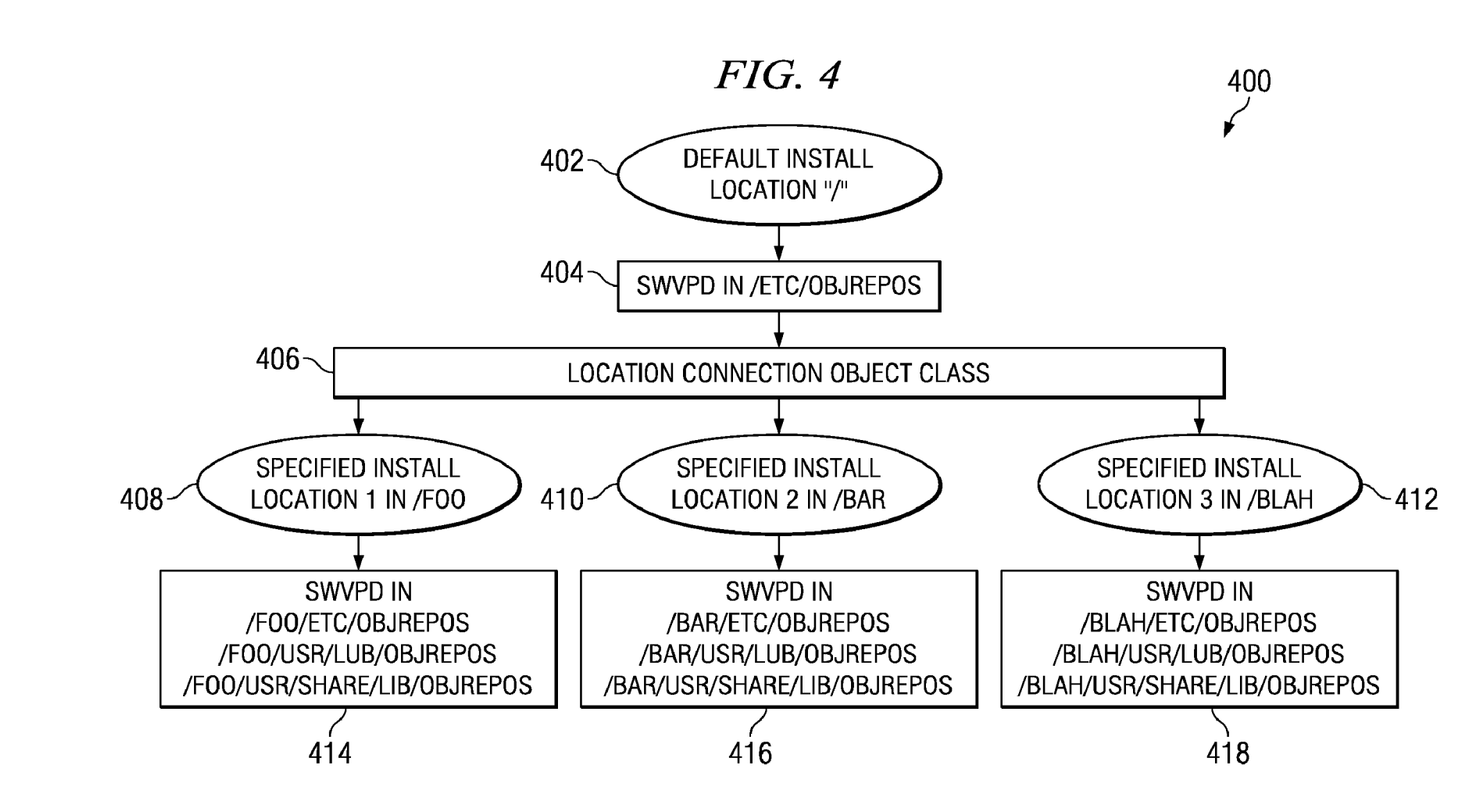
FIG. 4 is a block diagram illustrating the relationship between the product data connector object and the install USIL install locations, in accordance with an illustrative embodiment.

Referring now to FIG. 4, a block diagram illustrating the relationship between the product data connector object and the install USIL install locations is shown in accordance with an illustrative embodiment.

Product data is installed in the default location (block 402). For most software applications, the default install location is the root directory "/". Block 404 shows root information installed to the default path location /etc/objrepos. Root product data is typically maintained at this default path location. Root product data class files can include files such as software and version history, file inventory, license program products, and product names.

The location connection object class data base (block 406) includes the install location of the software in the specified USIL. A user examining the location connection object class can then determine a global view of the USIL install locations of deliverables on the system. Each time a deliverable is installed to a USIL, a corresponding entry on location connection object class is updated with the USIL install location of the deliverable.

In the present example, three USIL install locations are specified. Software deliverables are therefore mirrored to and stored in 3 different USILs: /foo (block 408), /bar (block 410), and /blah (block 412). Each USIL instance mirrors the product data structure with the relocated path. For maximum flexibility and consistency, all entries in the USIL product data will appear identical to corresponding entries in the default path. In other words, the USIL product data entries will not contain any reference to the relocated path, instead the installer will interpret USIL data and prefix the relocated path as needed.

The /etc/objrepos product data is installed in each of the USIL instances in the appropriate USIL parts, as shown in blocks 414-418. Usr product data is mirrored from the location connection object class to each specified USIL instance: /foo/usr/lib/objrepos, /bar/usr/lib/objrepos, and /blah/usr/lib/objrepos. Root product data is mirrored from the location connection object class to each specified USIL instance: /foo/etc/objrepos, /bar/etc/objrepos, and /blah/etc/objrepos. Share product data is mirrored from the location connection object class to each specified USIL instance: /foo/usr/share/lib/objrepos, /bar/usr/share/lib/objrepos, and /blah/usr/share/lib/objrepos.

Figure 5:
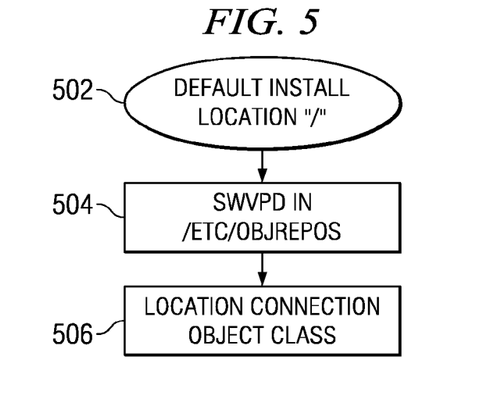
FIG. 5 is a block diagram illustrating the product data connector object when no USIL instances are specified, in accordance with an illustrative embodiment.

Referring now to FIG. 5, a block diagram illustrating the product data connector object is shown when no USIL instances are specified in accordance with an illustrative embodiment.

Product data is installed in the default location (block 502). For most software applications, the default install location is the root directory "/". Block 504 shows root information installed to the default path location /etc/objrepos. Root product data is typically maintained at this default path location. Root product data class files can include files such as software and version history, file inventory, license program products, and product names.

The location connection object class data base (block 506) includes the install location of the software in the specified USIL. A user examining the location connection object class can then determine a global view of the USIL install locations of deliverables on the system. Each time a deliverable is installed to a USIL, a corresponding entry on location connection object class is updated with the USIL install location of the deliverable.

Figure 6:
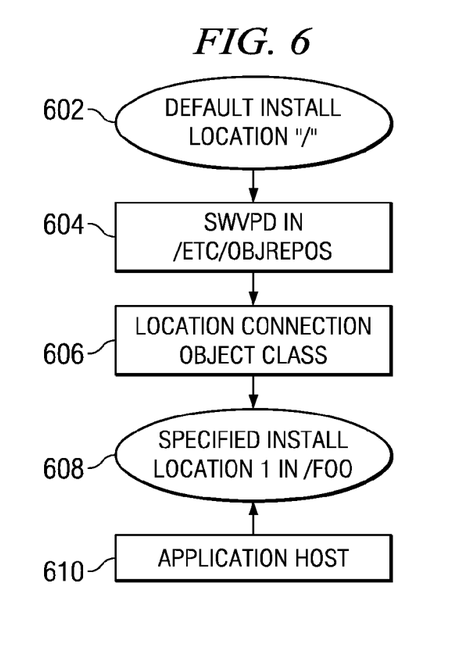
FIG. 6 is a block diagram illustrating the product data connector object to a single USIL instances along with an application host referencing that USIL instance, in accordance with an illustrative embodiment.

Referring now to FIG. 6, a block diagram illustrating the product data connector object to a single USIL instances along with an application host referencing that USIL instance is shown in accordance with an illustrative embodiment.

Product data is installed in the default location (block 602). For most software applications, the default install location is the root directory "/". Block 604 shows root information installed to the default path location /etc/objrepos. Root product data is typically maintained at this default path location. Root product data class files can include files such as software and version history, file inventory, license program products, and product names.

The location connection object class data base (block 606) includes the install location of the software in the specified USIL. A user examining the location connection object class can then determine a global view of the USIL install locations of deliverables on the system. Each time a deliverable is installed to a USIL, a corresponding entry on location connection object class is updated with the USIL install location of the deliverable.

In the present example, a single USIL install location is specified. Software deliverables are therefore mirrored to and stored in USIL /foo (block 608). Each USIL instance mirrors the product data structure with the relocated path. For maximum flexibility and consistency, all entries in the USIL product data will appear identical to corresponding entries in the default path. In other words, the USIL product data entries will not contain any reference to the relocated path. Instead the installer will interpret USIL data and append the USIL information to the default path as needed.

An application host (block 610) can then execute the open the files directly from the USIL instance. An application host is a computer that runs application instances. The reallocatable application in the USIL instance that is served by the application host can be attached either locally, such as SAN, or disk copy, or remotely, such as NSF, GPFS, etc. A connection entry is made in the location connection object class that attaches the application host to the USIL instance.

Figure 7:
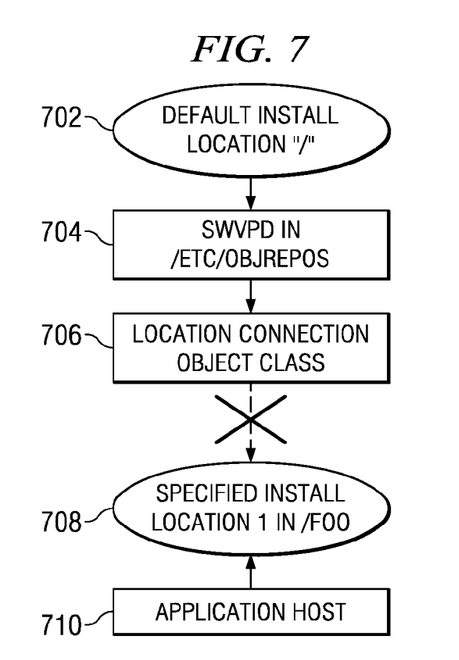
FIG. 7 is a block diagram illustrating the product data connector object to a single USIL instances along with an application host referencing that USIL instance, in accordance with an illustrative embodiment.

Referring now to FIG. 7, a block diagram illustrating the product data connector object to a single USIL instances along with an application host referencing that USIL instance is shown in accordance with an illustrative embodiment.

Blocks 702-706 are similar to blocks 602-606 described in FIG. 6. Software deliverables are mirrored to and stored in USIL /foo (block 708) as described in FIG. 6. Each USIL instance mirrors the product data structure with the relocated path. For maximum flexibility and consistency, all entries in the USIL product data will appear identical to corresponding entries in the default path. In other words, the USIL product data entries will not contain any reference to the relocated path. Instead the installer will interpret USIL data and append the USIL information to the default path as needed.

An application host (block 710) can then execute the open the files directly from the USIL instance. An application host is a computer that runs application instances. The reallocatable application in the USIL instance that is served by the application host can be attached either locally such as SAN, or disk copy, or remotely, such as NSF, GPFS, etc. A connection entry is made in the location connection object class that attaches the application host to the USIL instance.

As a result, the data processing system has detached the relocatable application stored in the /foo USIL. The connection entry is therefore deleted from the location connection object class. The /foo USIL instance can then be exported to other data processing systems for attachment thereon. Because all of the product data for a software is stored within the USIL, provisioning preinstalled applications in the /foo USIL to different locations becomes trivial.

Figure 8:
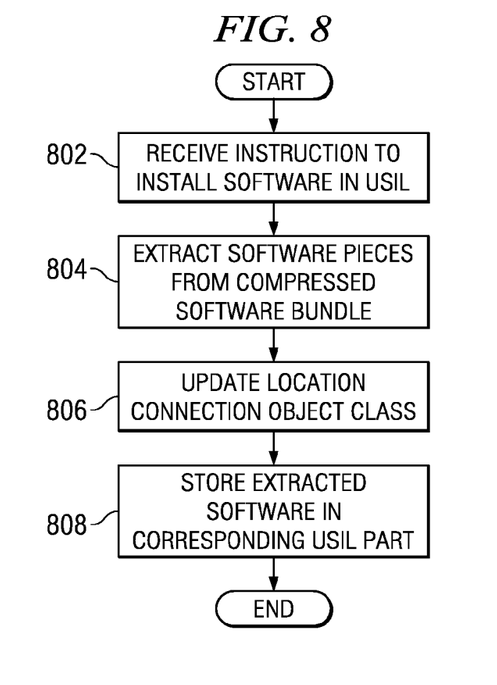
FIG. 8 is a flowchart for a process for installing a software package in a user-specified install location, in accordance with an illustrative embodiment.

Referring now to FIG. 8, a flowchart for a process for installing a software package in a user-specified install location is shown, in accordance with an illustrative embodiment. Process 800 is a software process such as installer 314 of FIG. 3.

When a software installation begins, process 800 receives an instruction from a user to install the software bundle in a specified USIL (step 802). The received instruction specifies to process 800 one or more USILs in which to install the extracted pieces of the compressed software bundle.

Process 800 then extracts software pieces from the compressed software bundle (step 804). Relevant information is "unpacked" from compressed software bundle and the placed into corresponding directories and path locations on the computer. The condensed software bundle is expanded into a readable format that is usable by the operating system and other software applications that may also be executed on the data processing system.

Process 800 then updates the location connection object class data base to include the install location of the software in the specified USIL, as well as the USIL information itself (step 806). A user examining the location connection object class can then determine a global view of the USIL install locations of deliverables on the system. Each time a deliverable is installed to a USIL, a corresponding entry on location connection object class is updated with the USIL install location of the deliverable.

Process 800 then stores the extracted software pieces in the corresponding USIL parts (step 808). Usr deliverables are installed directly to path locations /USIL/usr and /USIL/opt. The product data corresponding to the usr part is typically maintained at the path location /USIL/usr/lib/objrepos. Root deliverables are installed directly to path location /USIL/file. Root product data is typically maintained at the path location /USIL/etc/objrepos. Share product data is installed directly to path location /USIL/usr/share/lib/objrepos.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for installing deliverables, the computer implemented method comprising:
   providing a set of user-specified install locations;
   subdividing installation of the deliverables by a native proprietary package management system for handling the installation of software in an operating system, the deliverables being divided into a first part for files and configurations that are common across systems containing a portion of the deliverables that can be shared by machines having a same hardware architecture, a second part for files and configurations that are local to a system containing a portion of the product that cannot be shared, and a third part for files and configuration that are common across systems containing that portion of the deliverables that can be shared by machines having different hardware architecture;
   installing the first part into a first directory of a first user-specified install location of the set of user-specified install locations, the second part into a second directory of the first user-specified install location of the set of user-specified install locations, and the third part into a third directory of the first user-specified install location of the set of user-specified install locations, wherein each of the first directory, the second directory and the third directory is a subdirectory relative to the first user-specified install location;
   responsive to installing the deliverables into the first user-specified install location, updating a corresponding entry of a data base containing other install locations with the first user-specified install location with the path for each installed program relative to the first user-specified install location;

extracting software virtual product data from a software bundle, wherein the software virtual product data includes a software version number, a software version history, an inventory, a license program product, a software name, and a vendor names; and storing the software virtual product data in a location connection object class not within the first user-specified install location.

2. The computer implemented method of claim 1, wherein the first part, the second part, and the third part comprise a usr part, a root part, and a share part.

3. The computer implemented method of claim 1, further comprising detaching the at least one user-specified install location from the location connection object class.

4. The computer implemented method of claim 1, wherein the at least one user-specified install location is a first user-specified install location, the method further comprising:

subdividing a second installation of the deliverables by the native proprietary package management system for handling the installation of software in the operating system, the second installation of the deliverables being divided into a fourth part for files and configurations that are common across systems containing a portion of the deliverables that can be shared by machines having a same hardware architecture, a fifth part for files and configurations that are local to a system containing a portion of the product that cannot be shared, and a sixth part for files and configuration that are common across systems containing that portion of the deliverables that can be shared by machines having different hardware architecture;

installing the fourth part into a first directory of a second user-specified install location of the set of user-specified install locations, the fifth part into a second directory of the second user-specified install location of the set of user-specified install locations, and the sixth part into a third directory of the second user-specified install location of the set of user-specified install locations, wherein each of the fourth directory, the fifth directory and the sixth directory is a subdirectory relative to the second user-specified install location;

responsive to installing the deliverables into the second user-specified install location, updating a second corresponding entry of the data base containing other install locations with the second user-specified install location with the path for each installed program relative to the second user-specified install location.

5. The computer implemented method of claim 4, wherein the method is executed in a UNIX based operating system.

6. A computer program product in a computer-readable storage medium for installing deliverables, the computer program product comprising:

instructions for providing at least one user-specified install location;

instructions for subdividing installation of the deliverables by a native proprietary package management system for handling the installation of software in an operating system, the deliverables being divided into a first part for files and configurations that are common across systems containing a portion of the deliverables that can be shared by machines having a same hardware architecture, a second part for files and configurations that are local to a system containing a portion of the product that cannot be shared, and a third part for files and configuration that are common across systems containing that portion of the deliverables that can be shared by machines having different hardware architecture;

instructions for installing the first part into a first directory of a first user-specified install location of the set of user-specified install locations, the second part into a second directory of the first user-specified install location of the set of user-specified install locations, and the third part into a third directory of the first user-specified install location of the set of user-specified install locations, wherein each of the first directory, the second directory and the third directory is a subdirectory relative to the first user-specified install location;

responsive to installing the deliverables into the first user-specified install location, updating a corresponding entry of a data base containing other install locations with the first user-specified install location with the path for each installed program relative to the first user-specified install location;

instructions for extracting software virtual product data from a software bundle, wherein the software virtual product data includes a software version number, a software version history, an inventory, a license program product, a software name, and a vendor names; and instructions for storing the software virtual product data in a location connection object class database not within the first user-specified install location.

7. The computer program product of claim 6, wherein the first part, the second part, and the third part comprise a usr part, a root part, and a share part.

8. The computer program product of claim 6, further comprising instructions for detaching the at least one user-specified install location from the location connection object class.

9. The computer program product of claim 6, wherein the at least one user-specified install location is a first user-specified install location, the computer program product further comprising:

instructions for subdividing a second installation of the deliverables by the native proprietary package management system for handling the installation of software in the operating system, the second installation of the deliverables being divided into a fourth part for files and configurations that are common across systems containing a portion of the deliverables that can be shared by machines having a same hardware architecture, a fifth part for files and configurations that are local to a system containing a portion of the product that cannot be shared, and a sixth part for files and configuration that are common across systems containing that portion of the deliverables that can be shared by machines having different hardware architecture;

instructions for installing the fourth part into a first directory of a second user-specified install location of the set of user-specified install locations, the fifth part into a second directory of the second user-specified install location of the set of user-specified install locations, and the sixth part into a third directory of the second user-specified install location of the set of user-specified install locations, wherein each of the fourth directory, the fifth directory and the sixth directory is a subdirectory relative to the second user-specified install location;

instructions, responsive to installing the deliverables into the second user-specified install location, for updating a second corresponding entry of the data base containing other install locations with the second user-specified install location with the path for each installed program relative to the second user-specified install location.

10. The computer program product of claim 9, wherein the computer program product is executable in a UNIX based operating system.

11. A data processing system comprising:
a memory containing a set of instructions; and
a processor for executing the set of instructions, wherein executing the set of instructions comprises: providing a set of user-specified install locations; subdividing installation of the deliverables by a native proprietary package management system for handling the installation of software in an operating system, the deliverables being divided into a first part for files and configurations that are common across systems containing a portion of the deliverables that can be shared by machines having a same hardware architecture, a second part for files and configurations that are local to a system containing a portion of the product that cannot be shared, and a third part for files and configuration that are common across systems containing that portion of the deliverables that can be shared by machines having different hardware architecture; installing the first part into a first directory of a first user-specified install location of the set of user-specified install locations, the second part into a second directory of the first user-specified install location of the set of user-specified install locations, and the third part into a third directory of the first user-specified install location of the set of user-specified install locations, wherein each of the first directory, the second directory and the third directory is a subdirectory relative to the first user-specified install location; responsive to installing the deliverables into the first user-specified install location, updating a corresponding entry of a data base containing other install locations with the first user-specified install location with the path for each installed program relative to the first user-specified install location; extracting software virtual product data from a software bundle, wherein the software virtual product data includes a software version number, a software version history, an inventory, a license program product, a software name, and a vendor names; and storing the software virtual product data in a location connection object class not within the first user-specified install location.

12. The data processing system of claim 11, wherein the first part, the second part, and the third part comprise a usr part, a root part, and a share part.

13. The data processing system of claim 11, wherein the set of instructions further comprises detaching the at least one user-specified install location from the location connection object class.

14. The data processing system of claim 11, wherein the at least one user-specified install location is a first user-specified install location, the set of instructions further comprising: subdividing a second installation of the deliverables by the native proprietary package management system for handling the installation of software in the operating system, the second installation of the deliverables being divided into a fourth part for files and configurations that are common across systems containing a portion of the deliverables that can be shared by machines having a same hardware architecture, a fifth part for files and configurations that are local to a system containing a portion of the product that cannot be shared, and a sixth part for files and configuration that are common across systems containing that portion of the deliverables that can be shared by machines having different hardware architecture; installing the fourth part into a first directory of a second user-specified install location of the set of user-specified install locations, the fifth part into a second directory of the second user-specified install location of the set of user-specified install locations, and the sixth part into a third directory of the second user-specified install location of the set of user-specified install locations, wherein each of the fourth directory, the fifth directory and the sixth directory is a subdirectory relative to the second user-specified install location; responsive to installing the deliverables into the second user-specified install location, updating a second corresponding entry of the data base containing other install locations with the second user-specified install location with the path for each installed program relative to the second user-specified install location.

* * * * *